United States Patent
Choi et al.

(10) Patent No.: US 10,700,747 B2
(45) Date of Patent: Jun. 30, 2020

(54) WIRELESS COMMUNICATIONS METHOD AND DEVICE USING HYBRID BEAMFORMING

(71) Applicant: SK Telecom Co., Ltd., Seoul (KR)

(72) Inventors: Changsoon Choi, Seoul (KR); Haesung Park, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 7 days.

(21) Appl. No.: 15/762,795

(22) PCT Filed: May 12, 2016

(86) PCT No.: PCT/KR2016/004989
§ 371 (c)(1),
(2) Date: Mar. 23, 2018

(87) PCT Pub. No.: WO2017/065372
PCT Pub. Date: Apr. 20, 2017

(65) Prior Publication Data
US 2018/0269946 A1 Sep. 20, 2018

(30) Foreign Application Priority Data

Oct. 12, 2015 (KR) .......................... 10-2015-0142186

(51) Int. Cl.
*H04B 7/06* (2006.01)
*G01S 7/28* (2006.01)
(Continued)

(52) U.S. Cl.
CPC .......... *H04B 7/0617* (2013.01); *G01S 7/2813* (2013.01); *H01Q 3/2617* (2013.01);
(Continued)

(58) Field of Classification Search
None
See application file for complete search history.

(56) References Cited

U.S. PATENT DOCUMENTS 4,389,649 A * 6/1983 Parkhurst ............. G01S 13/343
342/189
5,369,412 A * 11/1994 Tsujimoto ........... H01Q 3/2629
342/380

(Continued)

FOREIGN PATENT DOCUMENTS

JP 2000-209017 A 7/2000
JP 2002-111564 A 4/2002
(Continued)

OTHER PUBLICATIONS

Extended European Search Report dated Sep. 25, 2018, corresponding to European Application No. 16855590.2 citing the above reference(s).

(Continued)

*Primary Examiner* — Bunjob Jaroenchonwanit
(74) *Attorney, Agent, or Firm* — Hauptman Ham, LLP

(57) ABSTRACT

The present disclosure relates to a wireless communications technology. Specifically, the present disclosure provides a method and device for reducing terminal interference due to sidelobes on the basis of channel state information (CSI) in a hybrid beamforming architecture.

7 Claims, 6 Drawing Sheets

(51) Int. Cl.
*H04B 7/04* (2017.01)
*H01Q 3/26* (2006.01)
*H04B 7/0452* (2017.01)
*H04W 24/08* (2009.01)

(52) U.S. Cl.
CPC .............. *H04B 7/04* (2013.01); *H04B 7/0452* (2013.01); *H04B 7/06* (2013.01); *H04W 24/08* (2013.01)

(56) References Cited

U.S. PATENT DOCUMENTS

| | | | | |
|---|---|---|---|---|
| 5,465,396 | A * | 11/1995 | Hunsinger | H04H 20/30 375/232 |
| 5,493,307 | A * | 2/1996 | Tsujimoto | H01Q 3/2629 342/375 |
| 5,600,326 | A * | 2/1997 | Yu | G01S 7/2813 342/149 |
| 6,404,806 | B1 * | 6/2002 | Ginesi | H04L 25/03012 375/222 |
| 7,012,556 | B2 * | 3/2006 | Dean | H04B 7/0848 341/120 |
| 7,888,973 | B1 * | 2/2011 | Rezzi | H03L 7/085 327/105 |
| 8,929,322 | B1 | 1/2015 | Kludt | |
| 2002/0145551 | A1 * | 10/2002 | Arnaud | H03M 3/392 341/143 |
| 2006/0238268 | A1 | 10/2006 | Kwun et al. | |
| 2007/0225581 | A1 * | 9/2007 | Diab | A61B 5/14546 600/323 |
| 2010/0118922 | A1 * | 5/2010 | Ahn | H04B 7/15585 375/214 |
| 2011/0140790 | A1 * | 6/2011 | Wu | H03L 7/1976 331/25 |
| 2011/0150045 | A1 * | 6/2011 | Thompson | H04B 1/28 375/147 |
| 2011/0164668 | A1 | 7/2011 | Hoek et al. | |
| 2012/0276937 | A1 | 11/2012 | Astely et al. | |
| 2013/0163705 | A1 * | 6/2013 | Stirland | H01Q 3/26 375/346 |
| 2013/0202054 | A1 * | 8/2013 | Khan | H01Q 3/26 375/259 |
| 2013/0301454 | A1 | 11/2013 | Seol et al. | |
| 2014/0073337 | A1 * | 3/2014 | Hong | H04W 16/28 455/452.1 |
| 2014/0177770 | A1 * | 6/2014 | Katumba | H03L 7/093 375/374 |
| 2014/0307654 | A1 | 10/2014 | Kim | |
| 2015/0163848 | A1 * | 6/2015 | Lin | H04B 7/18506 370/329 |
| 2015/0282122 | A1 | 10/2015 | Kim | |
| 2016/0269093 | A1 * | 9/2016 | Seol | H04B 7/043 |
| 2016/0294453 | A1 * | 10/2016 | Truong | H04B 7/0452 |
| 2016/0345216 | A1 * | 11/2016 | Kishiyama | H04W 36/0083 |
| 2016/0373175 | A1 * | 12/2016 | Harrison | H04B 7/0469 |
| 2017/0264355 | A1 * | 9/2017 | Zhang | H04J 11/003 |
| 2017/0272281 | A1 * | 9/2017 | Kim | H04J 11/0036 |
| 2018/0027441 | A1 * | 1/2018 | Kim | H04B 7/0452 370/311 |
| 2018/0063826 | A1 * | 3/2018 | Kim | H04B 7/0413 |
| 2018/0132125 | A1 * | 5/2018 | Li | H04W 24/10 |
| 2018/0198645 | A1 * | 7/2018 | Wang | H04L 5/0048 |
| 2019/0104549 | A1 * | 4/2019 | Deng | H04B 7/0617 |

FOREIGN PATENT DOCUMENTS

| | | |
|---|---|---|
| JP | 2012-503386 A | 2/2012 |
| JP | 2015-521815 A | 7/2015 |
| KR | 1020070039860 A | 4/2007 |
| KR | 10-2013-0127347 A | 11/2013 |
| KR | 10-2014-0141261 A | 12/2014 |

OTHER PUBLICATIONS

Japanese Office Action dated Nov. 13, 2019 in connection with the counterpart Japanese Patent Application No. 2018-538507.
Hiroki Iura et al., A Study on Massive MIMO using APAA-MIMO Consisting of Sub-array Antennas, 2014 Society Conference of IEICE, Sep. 23-26, 2014, p. 332, IEICE.
Korean Decision to Grant Patent dated Mar. 5, 2020, in connection with the Korean Patent Application No. 10-2015-0142186.

* cited by examiner

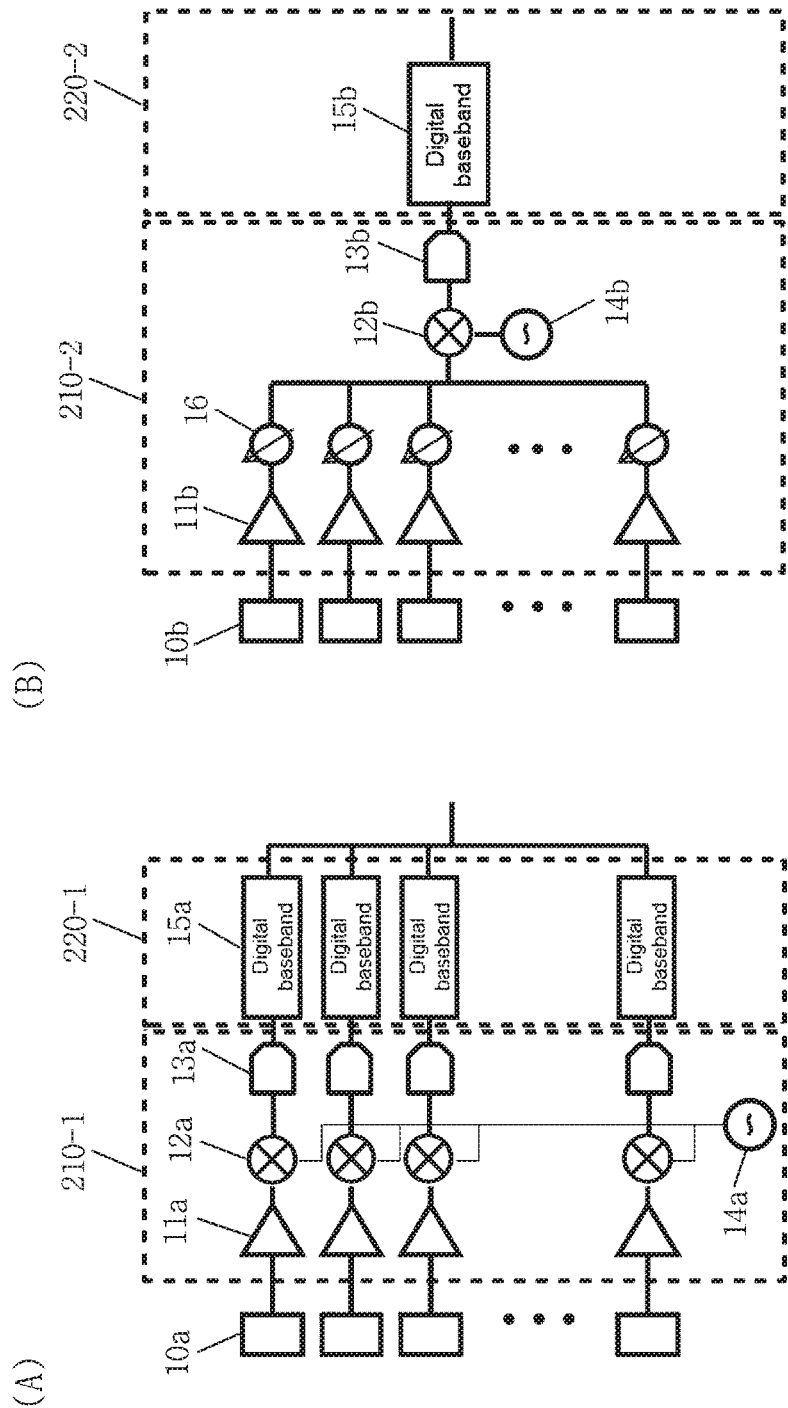
[FIG. 1]

[FIG. 2]
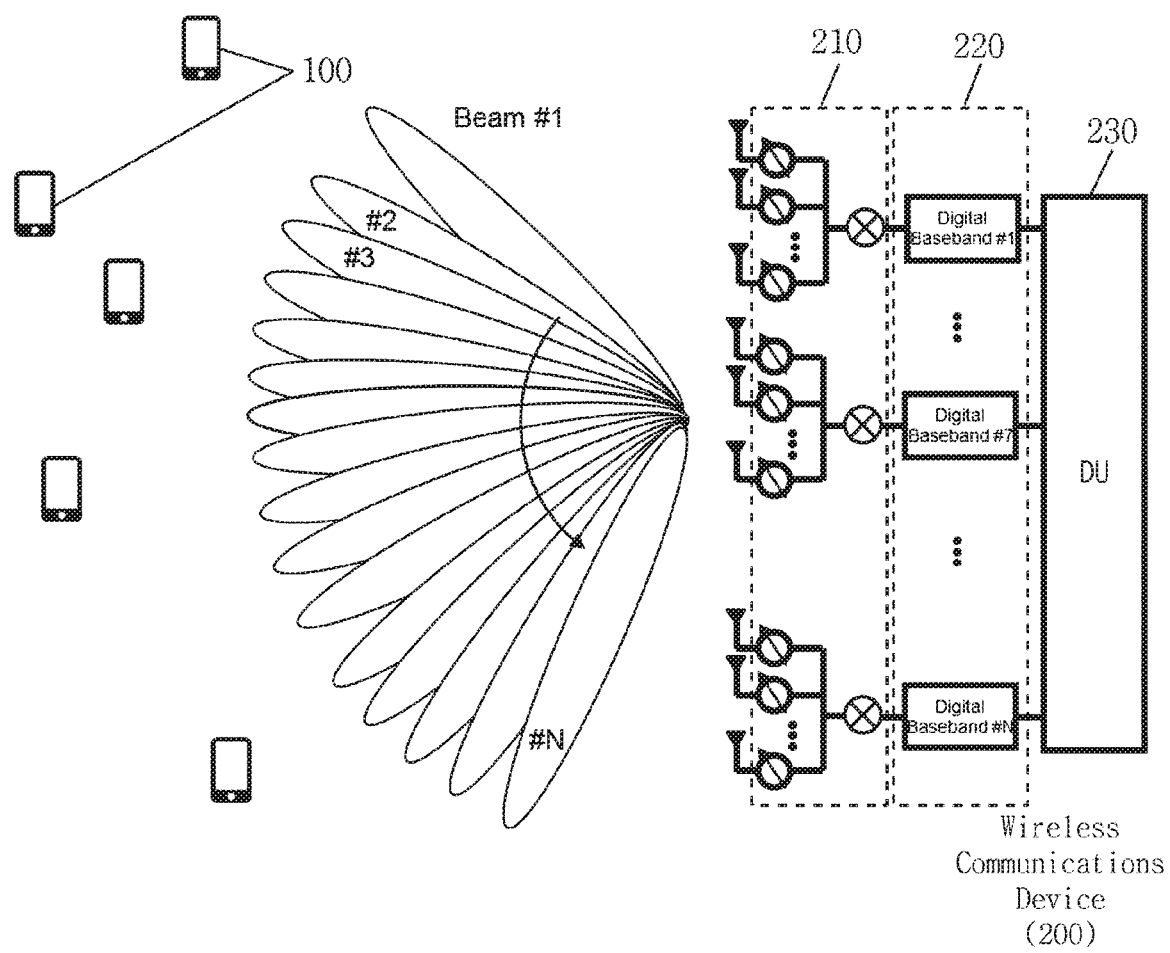

[FIG. 3]
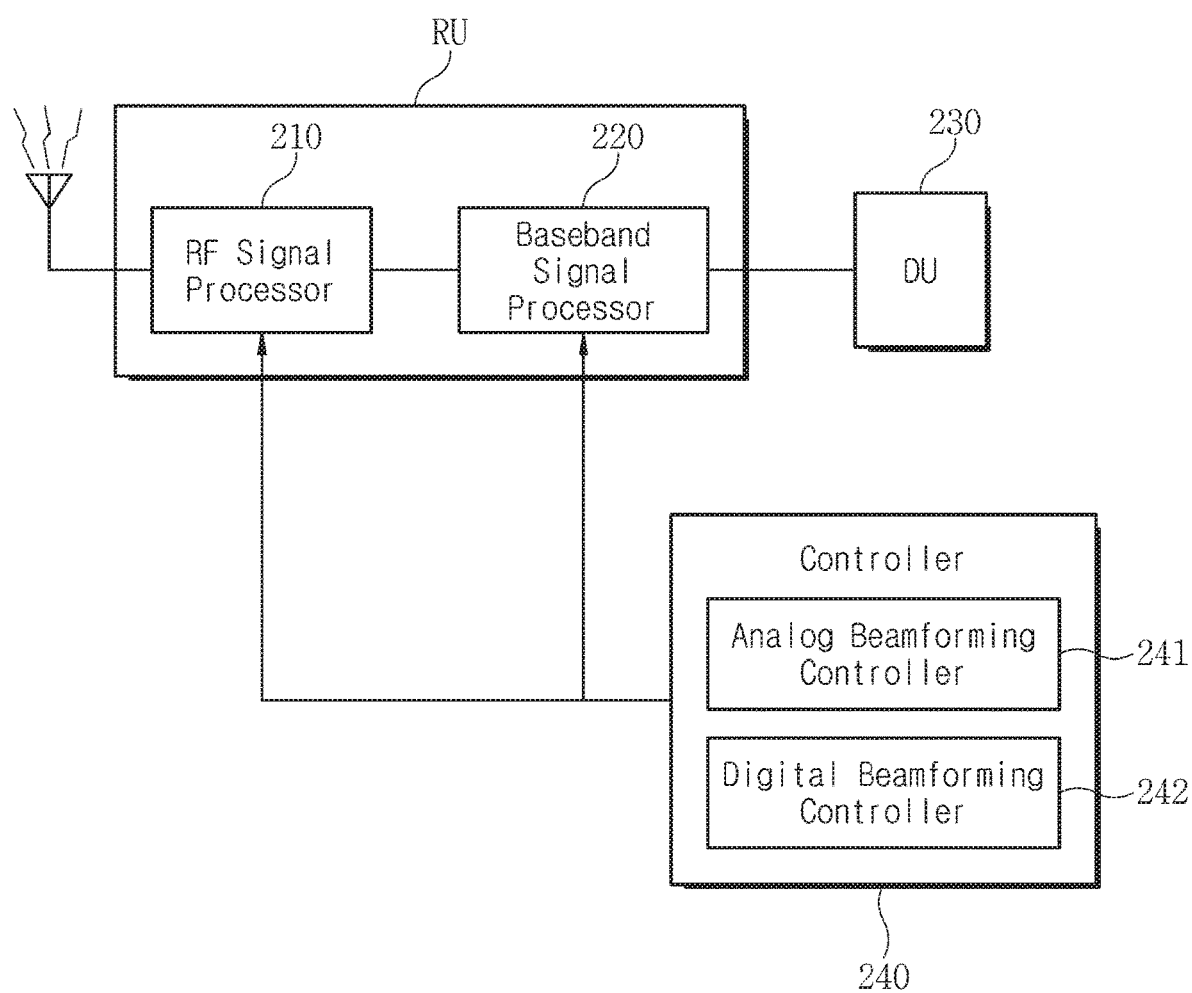

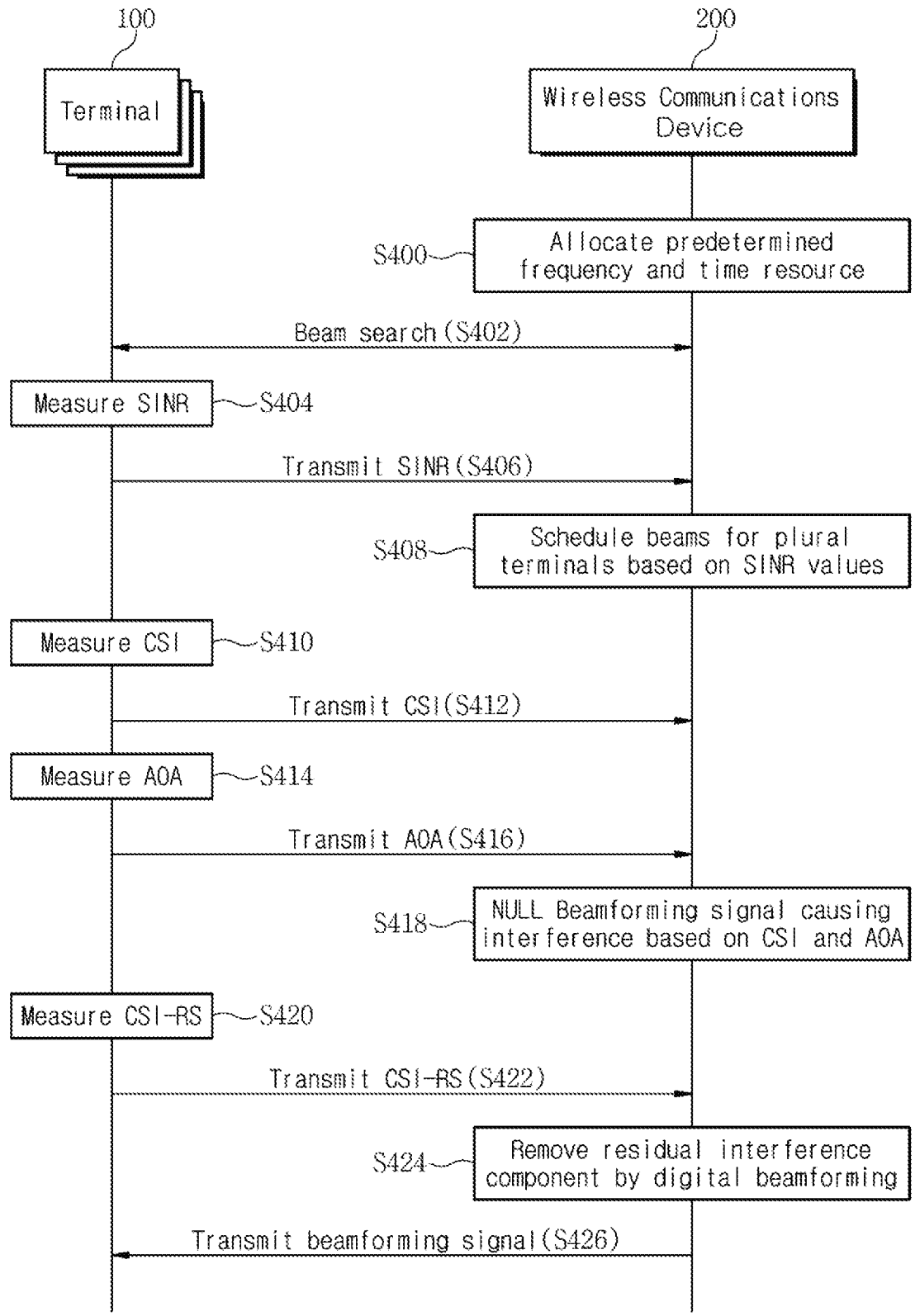

[FIG. 5]
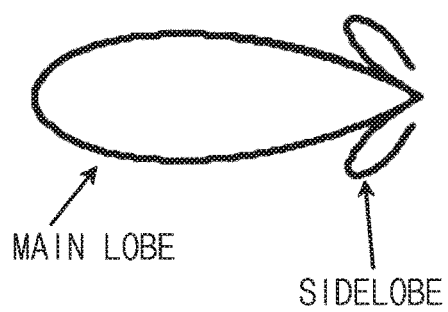
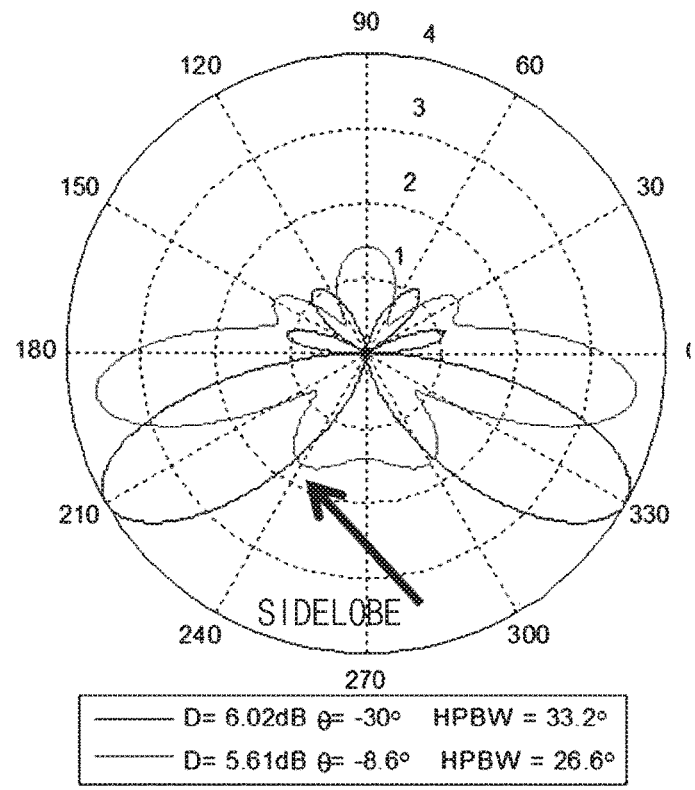

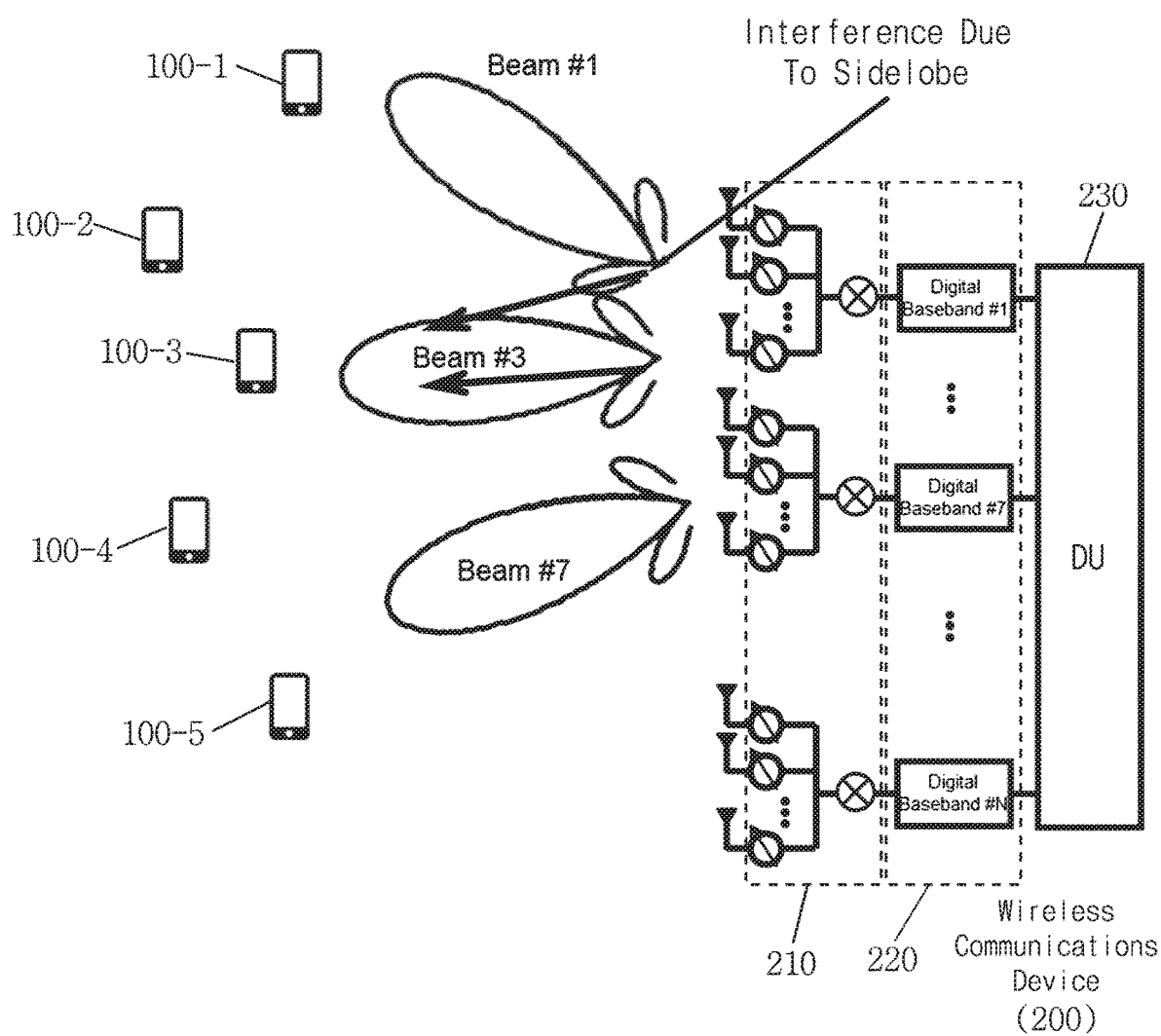
[FIG. 6]

WIRELESS COMMUNICATIONS METHOD AND DEVICE USING HYBRID BEAMFORMING

TECHNICAL FIELD

The present disclosure relates to a wireless communications technology and, more particularly, to a method and device for reducing terminal interference due to sidelobes on the basis of channel state information (CSI) in a hybrid beamforming architecture.

BACKGROUND ART

The descriptions in this section merely provide background information of embodiments of the present disclosure and are not intended to specify prior arts of the present disclosure.

Emergences of next generation mobile communication systems such as 5th generation (5G) mobile networks increase the necessity of a wireless transmission technology capable of transmitting high speed data of one Gigabytes per second (Gbps) or faster. Meanwhile, the radio frequency of a millimeter-wave band, in which it is easy to secure a bandwidth of several hundred MHz or more, is getting more attention than ever. At the time this International application is being filed, the 3rd Generation Partnership Project (3GPP) has begun discussing the standardization of the 5G networks, and the other companies and organizations are actively discussing standard technologies and developing element technologies of the 5G system.

Here, the millimeter-wave refers to an electromagnetic wave having a frequency of 30 GHz or higher, for example, 30-300 GHz. In particular, frequencies of 28 GHz, 38 GHz, 60 GHz, and 70 GHz are currently being considered as frequencies for use in the 5G network.

A signal in the frequencies of the millimeter-wave band experiences a higher transmission loss in the air and undergoes less diffraction than the frequencies in a conventional 4G frequency band, Thus, a beamforming technique for concentrating radio waves in a desired direction using a plurality of antennas will generally be utilized for the wireless transmission.

The beamforming refers to a signal processing technique for directional signal transmission or reception in such a way that the energy radiated from or received by an antenna is concentrated in a particular direction in space. The beamforming allows to receive a stronger signal from a desired direction or to transmit a stronger signal in a desired direction while reducing a signal transmitted to or received from an undesired direction.

In the conventional 4G frequency band, digital beamforming which adjusts both amplitude and phase of a signal in a digital baseband is used generally. However, in a higher frequency band including the millimeter-wave band, an analog beamforming is expected to be used due to the complexity of a radio frequency (RF) stage and an analog-to-digital/digital-to-analog (AD/DC) converter and power consumption issues. In particular, de facto standards of IEEE 802.15.3c and 802.11ad for a wireless personal area network (PAN) and a local area network (LAN), respectively, using millimeter-wave 60 GHz correspond to examples which adopts the analog beamforming.

A hybrid beamforming which combines features of the digital beamforming and the analog beamforming may be used in a base station having relatively less complexity than a terminal. The hybrid beamforming utilizes the flexibility and the multilayer transmission capability of the digital beamforming and the simplicity of the analog beamforming.

A massive multiple-input multiple-output (MIMO) may be implemented by cost-effectively increasing the number of antennas through the hybrid beamforming. Further, a plurality of beamforming signals may be generated simultaneously in case of the hybrid beamforming. Accordingly, the hybrid beamforming allows the system to transmit the beamforming signal to a plurality of users using one frequency-time resource. Also, the hybrid beamforming may increase a signal-to-noise ratio (SNR) and enhance a frequency efficiency.

However, in this case, an interference problem may occur between beamforming signals transmitted to a plurality of users by use of the same frequency-time resource. Particularly, when the analog beamforming is utilized in the hybrid beamforming architecture, a sidelobe being transmitted in a direction other than the beamforming direction may become a problem.

Of course, it is possible to reduce the interference between the users by using MIMO digital processing. However, in this method, it is difficult to implement a rich channel appropriately, and there arises a problem such as a limitation of calculation. Accordingly, it is necessary to control the inter-user interference at the RF stage and the analog beamforming stage.

DISCLOSURE OF INVENTION

Technical Problem

Provided is an algorithm for suppressing inter-user signal interference that arises due to a sidelobe signal generated in a hybrid beamforming architecture. Specifically, the present disclosure provides a method and device for removing a signal causing the interference in an analog beamforming stage by use of signal-to-interference-plus-noise ratio (SINR) and channel state information (CSI) measured by a plurality of terminals during beam searching, and for removing residual interference component by digital beamforming.

It is to be understood that the technical problems to be solved by the present disclosure are not limited to the above-mentioned problems and other technical problems having not mentioned above will be apparent to those skilled in the art from the following description.

Technical Solution

According to an aspect of an exemplary embodiment, a wireless communications method using hybrid beamforming, includes: receiving a signal-to-interference-plus-noise ratio (SINR) measured for a plurality of beamforming signals of which direction angles are different from one another, from a plurality of terminals to which wireless resources are allocated; allocating the beamforming signals to each of the plurality of terminals based on a received SINR; measuring channel state information for each of allocated beamforming signals from the plurality of terminals; and nulling firstly a sidelobe signal of the allocated beamforming signals, through analog beamforming, that causes interference with another terminal based on the channel state information.

According to an aspect of another exemplary embodiment, a wireless communications device using hybrid beamforming, includes: an RF signal processor connected to an antenna stage; a baseband signal processor connected to the RF signal processor; and a controller comprising an analog beamforming control module suitable for controlling the RF signal processor to perform an analog beamforming and being configured to allocate beamforming signals to a plurality of terminals to which wireless resources are allocated. The controller measures channel state information for each of allocated beamforming signals from the plurality of terminals, controls the RF signal processor based on the channel state information to null firstly a sidelobe signal of the allocated beamforming signals that causes interference with another terminal.

Advantageous Effects

The present disclosure overcomes basic problems of a millimeter-wave radio transmission system and suppresses interferences generated due to sidelobes in a hybrid beamforming architecture. Thus, present disclosure facilitates providing a stable service by minimizing inter-terminal interferences among a plurality of terminals even when the plurality of terminals utilize the same frequency-time resource.

The advantageous effects of the present disclosure are not limited to the effects mentioned above, but other effects having not mentioned will be apparent to those skilled in the art from the following description.

DESCRIPTION OF DRAWINGS

A brief description is given for the enhancement of understanding of the accompanying drawings to be referred to in the description of the present disclosure, in which:

FIG. 1 is a schematic diagram illustrating a conventional digital beamforming and analog beamforming architectures;

FIG. 2 is a schematic block diagram illustrating a wireless communications system employing a hybrid beamforming architecture according to an embodiment of the present disclosure;

FIG. 3 is a block diagram of a wireless communications device using hybrid beamforming according to an embodiment of the present disclosure;

FIG. 4 is a flowchart illustrating a process of performing a wireless communications method using hybrid beamforming according to an embodiment of the present disclosure;

FIG. 5 illustrates an example of a beamforming pattern according to an embodiment of the present disclosure and interference caused the beamforming pattern; and FIG. 6 is a schematic diagram illustrating an interference that occurs according to the hybrid beamforming according to the embodiment of the present disclosure.

BEST MODE

For a more clear understanding of the features and advantages of the present disclosure, the present disclosure will be described in detail with reference to the accompanied drawings.

In the following description and the accompanied drawings, detailed descriptions of well-known functions or configuration that may obscure the subject matter of the present disclosure will be omitted for simplicity. It is to be noted that the same components are designated by the same reference numerals throughout the drawings.

The terminologies including ordinals such as "first" and "second" used to explain various elements in this specification may be used to discriminate an element from the other ones or for simplicity. For example, a second component may be referred to as a first component, and similarly, a first component may also be referred to as a second component without departing from the scope of the present disclosure.

When an element is referred to as being "connected" or "coupled" to another element, it means that it is logically or physically connected or it may be connected to the other element. In other words, it is to be understood that although an element may be directly connected or coupled to another element, there may be other elements therebetween, or element may be indirectly connected or coupled to the other element.

The terminology used herein is for the purpose of describing particular embodiments only and is not intended to be limiting of the disclosure. The singular forms include plural referents unless the context clearly dictates otherwise. Also, The expressions "~comprises," "~includes," "~constructed," "~configured" are not to be construed as being equipped with all the components, processing steps, or operations described in this specification, but some of the components, the processing steps, or the operations may not be included and additional elements may be incorporated further.

Terminologies such as "~unit" and "~module" refer to entities performing at least one function or operation, and may be implemented by hardware, software, or combination thereof.

The articles 'a,' 'an,' 'the,' 'one,' and their equivalents may be used in the sense of including both the singular and the plural meaning unless the context clearly indicates otherwise or is clearly contradicted by context in the context of describing the disclosure, particularly, in the context of the following claims. Detailed terminologies used herein for the purpose of facilitating understanding of the present disclosure, and the use of such specific terminologies may be changed into other forms without departing from the spirit of the present disclosure.

The wireless communications method using hybrid beamforming according to an embodiment of the present disclosure and a device for the method will now be described in detail with reference to FIGS. 1 through 6.

FIG. 1 illustrates a conventional digital beamforming and analog beamforming architectures.

Left portion (A) of FIG. 1 illustrates a wireless communications apparatus employing the digital beamforming architecture. Referring to the left portion (A) of FIG. 1, the wireless communications apparatus digital beamforming architecture includes a plurality of antennas 10a, a plurality of low-noise amplifiers (LNA) 11a each being connected to respective one of the plurality of antennas 10a, a plurality of mixers 12a each being connected to respective one of the plurality of low-noise amplifiers 11a, a plurality of antennas analog-to-digital converter 13a each being connected to respective one of the plurality of mixers 12a, a local oscillator (LO) 14a providing the mixers 12a with a local oscillation signal, and digital baseband modules 15a encoding the baseband signals output by the analog-to-digital converters 13a.

The low noise amplifiers 11a, the mixers 12a, the analog-to-digital converters 13a, and the local oscillator 14a constitute an RF signal processor 210-1, and process the RF signals received through the antennas 10a. The set of digital baseband modules 15a constitutes a base band signal processor 220-1, and processes the digital baseband band signals.

In the wireless communications apparatus having the above-described configuration, the beamforming is implemented by the digital baseband modules 15a.

Right portion (B) of FIG. 1 illustrates a wireless communications apparatus employing the analog beamforming architecture. Referring to the right portion (B) of FIG. 1, the wireless communications apparatus digital beamforming architecture includes a plurality of antennas 10b, a mixer 12b, an analog-to-digital converter 13b, a local oscillator 14b, a digital baseband module 15b, and a phase shifter 16.

The low noise amplifier 11b, the mixer 12b, the analog-to-digital converter 13b, the local oscillator 14b, and the phase shifter 16 constitute an RF signal processor 210-2. Also, the digital baseband module 15b constitutes a base band signal processor 220-2.

In the left portion (A) and right portion (B) of FIG. 1, each of the antennas 10a and 10b transmits or receives electromagnetic waves to or from a particular space for transmitting or receiving radio signals. The low-noise amplifiers 11a and 11b amplify weak signals received by the antennas 10a and 10b. The mixers 12a and 12b multiply the local oscillation signal to respective input signals, e.g. the output signals of the low-noise amplifier 11a and the phase shifter 16, respectively, using a nonlinear element to convert the frequencies of the input signals and recover baseband signals. The local oscillators 14a and 14b generate the local oscillation signal to be used for frequency conversion in the mixers 12a and 12b. The analog-to-digital converters 13a and 13b convert the baseband signal having a continuous analog signal form into a binary digital signal. The digital baseband modules 15a and 15b converts the digital signal into pulse train to be transmitted without modulation or demodulation.

In such configurations, the beamforming may be achieved through a control of a phase or amplitude of the signal. The phase represents a difference of a deviation expressed in degrees or time between two signals having the same frequency. The amplitude or strength refers to a maximum size of a fluctuation of the wave for which the beamforming is carried out.

In the wireless communications system based on the digital beamforming shown in the left portion (A) of FIG. 1 the beamforming of the RF signal radiated through the antenna 10a is carried out by performing a phase shift of the pulses in the baseband by the digital baseband module 15a. In the wireless communications system based on the analog beamforming shown in the right portion (B) of FIG. 1, the phase of the radio wave is changed at an RF end by controlling the phase shifter 16 provided in the RF signal processor 210-2.

In order to compensate for disadvantages of the analog beamforming and digital beamforming techniques while utilizing the advantages of them, a hybrid beamforming technique that combines the analog beamforming and digital beamforming has recently emerged. The present disclosure is based on the hybrid beamforming architecture. FIG. 2 is a schematic block diagram of a wireless communications system employing the hybrid beamforming architecture according to an embodiment of the present disclosure.

Referring to FIG. 2, the wireless communications system employing the hybrid beamforming architecture according to an embodiment of the present disclosure includes a plurality of terminals 100 and a wireless communications device 200.

The terminal 100 refers to a user device capable of connecting to a wireless communications network provided by the present disclosure for transmitting and receiving various data to and from the network. Here, the term 'terminal' may be replaced by another term such as a user equipment (UE), a mobile station (MS), a mobile subscriber station (MSS), a subscriber station (SS), an advanced mobile station (AMS), a wireless terminal (WT), a machine-type communications (MTC) device, a machine-to-machine (M2M) device, a device-to-device (D2D) device, a station (STA), or the like. However, the present disclosure is not limited thereto, and any device capable of being connected to the wireless communications network provided by the present disclosure may correspond to the terminal described herein. Any unit equivalent to the above-mentioned units may be used as the terminal 100 according to the present disclosure. The terminal 100 according to the present disclosure may perform voice or data communications through the wireless communication network provided by the present disclosure. The terminal 100 according to the present disclosure may include a browser for transmitting and receiving information, a memory for storing programs and protocols, and a microprocessor for executing various programs for operations and device control. The terminal 100 according to the embodiment of the present disclosure may be implemented in various forms.

For example, the terminal 100 described herein may be a mobile terminal to which a wireless communications technology is applied such as a smartphone, a tablet PC, a personal digital assistant (PDA), a portable multimedia player (PMP), and a MP3 player.

The wireless communications device 200 may be connected to one or more terminals 100 through radio resources to transmit and receive data to and from the terminals 100, and may serve as a base station (BS). For example, the wireless communications device 200 may refer to a node B, an evolved node B (eNodeB), an access point (AP), a radio access station (RAS), a base transceiver station (BTS), a mobile multi-hop relay (MMR)-BS, and so on, and may include all or some of the functions of the Node B, the eNodeB, the AP, the RAS, the BTS, and the MMR-BS. Also, the wireless communications device 200 may be implemented to include a base station controller (BSC) or a radio network controller (RNC). The wireless communications device 200 transmits a radio signal to the terminal 100. Specifically, the wireless communications device 200 may transmit one or more beamforming signals to the terminal 100 by assigning different frequency-time resources to the terminal 100.

In other words, the wireless communications device 200 establishes a connection to one or more terminals 100 located within communication coverage, and transmits and receives data with the terminals 100. Data transmitted from the wireless communications device 200 to the terminal 100 is referred to as a downlink signal. Data transmitted from the terminal 100 to the wireless communications device 200 is referred to as an uplink signal. Hereinbelow, the configuration and operation of the wireless communications device 200 according to an embodiment of the present disclosure will be described in detail.

FIG. 3 is a block diagram of a wireless communications device using hybrid beamforming according to an embodiment of the present disclosure. The wireless communications device described below may be installed on a base station side to perform wireless signal transmission and reception with a plurality of terminals.

Referring to FIG. 3, the wireless communications device 200 according to an embodiment of the present disclosure includes a radio signal processing unit (RU), a digital signal processing unit (DU) 230, and a controller 240. The radio signal processing unit (RU) includes a RF signal processor 210 and a baseband signal processor 220.

In the wireless communications device 200, the RU and the DU 230 may be separated physically and disposed at a remote place, and may be connected through an optical cable or the like.

Also, the RF signal processor 210 is connected to a plurality of antennas and processes signals transmitted and received through the antennas. Here, the antennas may be implemented by a phased array antenna, an adaptive array antenna, or a digital beamforming (DBF) antenna.

The RF signal processor 210, which adjusts the shape and direction of the beam using the differences of the amplitude and phase of a carrier signal in the RF band, includes a low noise amplifier, a filter, a mixer, a local oscillator, an analog-to-digital converter, and the like. The RF signal processor 210 performs a frequency down conversion process through by the above-described configuration.

In particular, the RF signal processor 210 includes a phase shifter and controls antenna elements in such a way that each antenna element shows a constant phase difference. The RF signal processor 210 may adjust the phase of each antenna element to determine the direction of the beam.

The baseband signal processor 220 receives a baseband digital signal output by the RF signal processor 210 and performs spatial processing on the signal. The baseband signal processor 220 may sample the electromagnetic waves, convert each of the signals received through the receiving elements into complex digital numbers, transmit them to a high-speed digital processor, and finally form a set of beams having different directions.

The baseband signal processor 220 may apply weighting vectors to the digitized signal while performing the signal processing. Also, the baseband signal processor 220 may have a configuration suitable for calculating each weight vector in such a manner that the shape of a transmitted or received beam converges to a desired beam pattern through a closed loop circuit. This may be accomplished by a beamforming algorithm such as Least Mean Squares (LMS) algorithm.

Alternatively, the baseband signal processor 220 may perform a combined function of beamforming and directivity.

The DU 230 performs digital signal processing and manages resources used for the processing in RU.

The controller 240 performs overall control of the wireless communications device 200 and may be implemented to include one or more processors. The processor may be a single-threaded processor, but may be a multithreaded processor alternatively. The controller 240 may operate by processing instructions stored in a storage device of the wireless communications device 200 in the one or more processors. The instructions may include interpretable instructions such as, for example, JavaScript or ECMAScript codes, executable codes, or other instructions stored in a computer readable medium.

In particular, a computer program for performing a wireless communications method using hybrid beamforming according to the present disclosure may be stored in a recording medium (e.g., a storage device in the wireless communications device 200) and may be loaded and executed by the controller 240. That is, the controller 240 operates according to the service logic of a analog beamforming control module 241 and a digital beamforming control module 242 to perform the functions according to the present disclosure.

The term 'module' used herein refers to a component that performs a predetermined function, and may be implemented by hardware, software, or a combination of hardware and software. For example, the module may refer to a program module, which includes components that may be executed by a processor to perform predetermined functions such as software components, object-oriented software components, class components, and task components, processes, functions, attributes, procedures, subroutines, segments of program codes, drivers, data, databases, data structures, tables, arrays, and variables. In addition, the functions provided by the components and modules may be associated with the smaller number of components and modules, or may be further fragmented into additional components and smaller modules.

The analog beamforming control module 241 may allocate beamforming signals to each of the plurality of terminals based on the signal-to-interference-plus-noise ratio (SINR). This can be done by selecting two or more terminals with the least interference and allocating the beamforming signals.

The analog beamforming control module 241 controls the RF signal processing unit 210 to remove sidelobes based on channel state information (CSI). The analog beamforming control module 241 may control the RF signal processor 210 to remove sidelobes based on an angle-of-arrival (AoA) additionally.

The digital beamforming control module 242 controls the baseband signal processing unit 220 to remove a sidelobe signal through a digital beamforming process. Various multiple-user MIMO (MU-MIMO) preceding algorithms such as a block diagonalization algorithm may be applied to the digital beamforming control module 242.

Also, the controller 240 may receive a strength of the allocated beamforming signal from the plurality of terminals after a first removal of the sidelobe signal, and measure the residual interference component of the sidelobe signal based on the strength of the allocated beamforming signal. The controller 240 may perform the digital beamforming process based on the measurement. This process may be performed by the analog beamforming control module 241 or the digital beamforming control module 242.

A process for suppressing inter-user interference due to sidelobes according to a wireless communications method using hybrid beamforming in accordance with an embodiment of the present disclosure will now be described with reference to FIGS. 4 through 6.

FIG. 4 is a flowchart illustrating a process of performing a wireless communications method using hybrid beamforming according to an embodiment of the present disclosure.

Referring to FIG. 4, the wireless communications device 200 first allocates a predetermined frequency-time resource for a beam search (S400). Subsequently, it can be seen from the drawing that, after the beam search is carried out using the beam of the allocated frequency band, the plurality of terminals 100 receives the beam search and measures various information, and the wireless communications device 200 allocates the beamforming signal based on the information and removes the interferences.

the wireless communications device 200 carries out the beam search to transmit the beamforming signal to a plurality of terminals 100 (S402). Accordingly, the plurality of terminals 100 measure the signal-to-interference-plus-noise ratio (SINR) for a plurality of beams radiated in different directions from the wireless communications device 200 and generate information of the measured SINR (S404). The wireless communications device 200 receives, from the plurality of terminals 100, SINR measurement information measured for each of the plurality of beamforming signals (S406).

FIG. 5 illustrates an example of a beamforming pattern according to an embodiment of the present disclosure and interference caused the beamforming pattern. In FIG. 5, one can grasp an actual radiation pattern of the beamforming signal transmitted by the wireless communications device 200 and the interferences occurred between the beamforming signals.

Left portion of FIG. 5 illustrates the beamforming pattern formed when the beamforming signal is transmitted a in the wireless communications device 200 according to an embodiment of the present disclosure. It can be seen in the drawing that, besides a main lobe radiated in an intended beamforming direction, sidelobes are generated in directions other than the intended beamforming direction.

Right portion of FIG. 5 illustrates interferences between a plurality of beamforming signals due to the generation of the sidelobes. It can be seen in the drawing that two beamforming signal having a strength of 6.02 dB and 5.61 dB, respectively, are radiated while generating sidelobes in directions other than the intended beamforming direction. If the direction of a sidelobe is similar to that of the main lobe of another beamforming signal, the sidelobe causes the interference problem due to a superposition with the main lobe of another beamforming signal.

FIG. 6 is a schematic diagram illustrating an interference that occurs according to the hybrid beamforming according to the embodiment of the present disclosure.

In FIG. 6, a side lobe of a first beam (beam #1) transmitted by the wireless communications device 200 interferes with a main lobe of a third beam (beam #3), so that a terminal 100-3 among the plurality of terminals 100 may happen to experience the interference problem while receiving the beamforming signal.

Similarly, a side lobe of the third beam (beam #3) may interfere with the main lobe of the first beam (beam #1), so that a terminal 100-1 may happen to experience the interference problem while receiving the beamforming signal.

In order to reduce such interferences, the wireless communications device 200 schedules the allocation of the beamforming signals in different directions for the plurality of terminals based on the SINR (S408). For this operation, the wireless communications device 200 allocates the same frequency-time resource, among the frequency-time resources prepared for the beam search, to terminals that bear the least interference while allocating different frequency-time resources to terminals suffering from severe interferences. For example, in FIG. 6, the signals that may be assigned with the same frequency-time resource may be the first beam (beam #1) and a seventh beam (beam #7) between which little interference is occurred.

However, even if a beamforming signal using the same frequency-time resource is allocated to a plurality of terminals 100 bearing the least interference, there may be some degree of interference between the terminals 100. In consideration of this matter, an operation of measuring the channel state information (CSI) is continued in order to suppress the interference caused by the sidelobes between the beaming signals allocated with the same frequency-time resource (S410).

The channel state information is information about a wireless channel state, which changes rapidly and largely at every moment in the wireless communications. The channel state information may be different depending on communication schemes. The wireless communication device 200 may use other kinds of channel state information periodically or may aperiodically measure and use the channel state information.

In order to measure the channel state information, the wireless communications device 200 may transmit a constant reference signal (CSI) to a plurality of terminals 100. Such a reference signal may be a beamforming signal used for performing the beam searching. The terminal 100 performs a predetermined calculation according to the reference signal received from the wireless communication device 200, and reports the result to the wireless communication device 200 (S412).

Also, the terminal 100 may measure the angle-of-arrival of the beamforming signal from the wireless communications device 200 (S414).

This is one of methods of estimating the position of a radio interference signal, and may be carried out by a positioning method of finding the direction of the signal at a receiving side and determining the location of a signal source. For example, in the case where a plurality of antennas are arranged in different directions for a single wireless communication device 200, it may be possible to receive an identification number of an antenna that transmits signals and identify a position or direction where the coverage of the antenna overlaps the direction of the source of the received signal as the position of the signal source causing the radio interference.

Alternatively, it may also be possible to measure the angle-of-arrivals with respect to the signal source at several places as the terminal 100 moves, and then find the radio interference signal source using change information of the angle-of-arrivals and movement information of the terminal 100.

In more detail, in such an operation, the terminal 100 transmits the values of the angle-of-arrivals to the wireless communications device 200 (S416), and the analog beamforming control module 241 in the wireless communications device 200 calculates the signal source that causes the radio interference, based on the values of the angle-of-arrivals.

After calculating the beamforming signal causing the radio interference based on the channel state information and the angle-of-arrivals, the analog beamforming control module 241 in the wireless communications device 200 may null the beamforming signal having caused the radio interference to suppress the interference (S418). The first removal (i.e., nulling) of the beamforming signal may be accomplished by removing sidelobes having caused the radio interference.

Although it was described above that the first removal operation utilizes both the channel state information and the angle-of-arrival, the first removal operation may be performed by a method of calculating the beamforming signal having caused the radio interference based on only the channel state information.

Even after the interference is removed by the analog beamforming control module 241, some residual inter-terminal interference may exist. In the case that two terminals are allocated with the same frequency-time resource and the interference is firstly eliminated through the analog beamforming control process, the strength of the allocated beamforming signals are received from the plurality of terminals to measure the residual interference. The residual interference of the sidelobe signal may be checked based on received strength values. Specifically, the terminals 100 may measure the signal strength using a different pilot signal or a channel state information reference signal (CSI-RS) from each beam (S420), and transmit a measured signal strength to the wireless communications device 200 so that the wireless communications device 200 may determine the residual interference component based on the measured signal strength.

Afterwards, the digital beamforming control module 242 removes the residual inter-terminal interference component (S424). This operation may use one of various MU-MIMO preceding algorithms such as the block diagonalization algorithm.

The beamforming signal from which the interference component is removed is transmitted for wireless communications with the terminal 100 (S426). Here, the transmission of the beamforming signal for the wireless communications continues after the step S408, and it is possible to remove the interference during the transmission.

Although the present specification and drawings describe exemplary device configurations, the functional operations and subject matters described herein may be implemented in other types of digital electronic circuitry, or may be formed computer software, firmware, or hardware including structures and structural equivalents thereof, and/or a combination of the hardware component and the software component. The subject matter described herein may be implemented by one or more computer program products, in other words, one or more modules of computer program instruction encoded in a intangible computer-readable program storage medium for controlling the operation of the device according to the present disclosure. The computer-readable medium may be a machine-readable storage device, a machine-readable storage substrate, a memory device, a composition of matter that affects the machine readable propagation-type signal, or a combination of one or more of the devices or the matter.

While the present specification contains a number of specific implementation details, it should be understood that they are not to be construed as limitations on the scope of any disclosure or claims, but as a description of features that may be specific to a particular embodiment of a particular disclosure. Certain features described with respect to contexts of independent embodiments may be implemented in combination in a single embodiment. Conversely, various features described in the context of a single embodiment may also be implemented in other embodiments either individually or in any suitable sub-combination. Further, although some features may be described to operate in a particular combination and may be initially depicted as so claimed, one or more features from the claimed combination may in some cases be excluded from the combination, and a claimed combination may be replaced by a sub-combination or a variant of the sub-combination.

Similarly, although the operations are depicted in the drawings in a particular order, it should not be understood that such operations need to be performed in that particular order or sequential order shown to achieve the desired result or all the depicted operations should be performed. In certain cases, multitasking and parallel processing may be advantageous. Also, The fragmentation of the various system components in the above-described embodiments should not be understood as requiring such fragmentation in all embodiments, and the program components and systems described above may generally be integrated together into a single software product or packaged into a multiple-function software product.

The descriptions set forth above disclose the best mode of the present disclosure, and is provided to illustrate the disclosure and to enable those skilled in the art to make and use the disclosure. The written description is not intended to limit the disclosure to the specific terminology presented.

Thus, although the present disclosure has been described in detail with reference to the above examples, those skilled in the art will be able to make adaptations, modifications, and variations on the examples without departing from the scope of the present disclosure.

Accordingly, the scope of the present disclosure should not be limited by the illustrated embodiments but should be defined by the appended claims.

INDUSTRIAL APPLICABILITY

The present disclosure may be applied to a field of wireless communications technology, and is industrially applicable as a method for implementing hybrid beamforming in a variety of communication systems.

According to the present disclosure, in a wireless communications network employing the hybrid beamforming, the interference caused by the sidelobe component is checked, and the beamforming is performed in consideration of the interference. Accordingly, the present disclosure may reduce the radio interference between the beamforming signals arising in the terminals connected to the wireless communications device Particularly, according to the present disclosure, even if the same frequency-time resource is used for wireless communication between a terminal and a base station for hybrid beamforming, it is possible to provide a stable service by minimizing radio wave interference to the terminal.

The invention claimed is:

1. A wireless communications method using hybrid beamforming, comprising:
   receiving a signal-to-interference-plus-noise ratio (SINR) measured for a plurality of beamforming signals of which direction angles are different from one another, from a plurality of terminals to which wireless resources are allocated;
   allocating the beamforming signals to each of the plurality of terminals based on a received SINR;
   measuring channel state information for each of beamforming signals from the plurality of terminals, wherein the channel state information includes an information on interferences caused by a sidelobe signal between beamforming signals allocated with the same frequency and the same time resource;
   nulling firstly the sidelobe signal of the beamforming signals allocated with the same frequency and the same time resource, through analog beamforming, that causes interference with another terminal based on the measured channel state information;
   receiving, from the each of the plurality of terminals, information on strength of the beamforming signals allocated with the same frequency and the same time resource, and determining residual interference component of the sidelobe signal based on the received information on the strength of the beamforming signals allocated with the same frequency and the same time resource; and
   nulling secondly the determined residual interference component of the sidelobe signal allocated with the same frequency and the same time resource, through digital beamforming, based on the received information on the strength of the beamforming signals.

2. The wireless communications method of claim 1, wherein the operation of allocating comprises:

selecting two or more terminals that reveals the least inter-terminal interference on the basis of the received SINR and allocating the beamforming signals to selected terminals.

3. The wireless communications method of claim 1, further comprising:
measuring an angle-of-arrival for each of the plurality of terminals, wherein the operation of nulling firstly comprises: nulling the sidelobe signal based on the channel state information and the angle-of-arrival.

4. The wireless communications method of claim 1, wherein the operation of nulling secondly uses a multiple-user multiple-input and multiple-output (MU-MIMO) preceding algorithm.

5. A wireless communications device using hybrid beamforming, comprising:
an RF signal processor connected to an antenna stage;
a baseband signal processor connected to the RF signal processor; and
a controller comprising
an analog beamforming control module configured to control the RF signal processor to perform an analog beamforming and being configured to allocate beamforming signals to a plurality of terminals to which wireless resources are allocated, and
a digital beamforming control module configured to control the baseband signal processor and performing digital beamforming,
wherein the controller is configured to
receive channel state information for each of allocated beamforming signals from the plurality of terminals, the channel state information including an information on interferences caused by a sidelobe signal between beamforming signals allocated with the same frequency and the same time resource, and
control the RF signal processor based on the channel state information to null firstly the sidelobe signal of the beamforming signals allocated with the same frequency and the same time resource that causes interference with another terminal, and
wherein the digital beamforming control module is configured to
receive, from each of the plurality of terminals, information on strength of the beamforming signals allocated with the same frequency and the same time resource,
determine residual interference component of the sidelobe signal based on the received information on the strength of the beamforming signals allocated with the same frequency and the same time resource, and
control the digital signal processor to null secondly the determined residual interference component of the sidelobe signal through the digital beamforming.

6. The wireless communications device of claim 5, wherein the controller further receives an angle-of-arrival for each of the plurality of terminals, controls the RF signal processor to remove the sidelobe signal that causes interference with another terminal based on the channel state information and the angle-of-arrival.

7. The wireless communications device of claim 5, wherein the controller selects two or more terminals that reveals the least inter-terminal interference on the basis of a received signal-to-interference-plus-noise ratio (SINR) received from a terminal and allocating the beamforming signals to selected terminals.

* * * * *